United States Patent [19]

Levy

[11] 4,324,575
[45] Apr. 13, 1982

[54] LOW TG SOFT UV-CURABLE COATINGS

[75] Inventor: Nicha Levy, Atlanta, Ga.

[73] Assignee: Bell Telephone Laboratories, Incorporated, Murray Hill, N.J.

[21] Appl. No.: 219,839

[22] Filed: Dec. 24, 1980

Related U.S. Application Data

[63] Continuation-in-part of Ser. No. 177,096, Aug. 11, 1980, abandoned.

[51] Int. Cl.³ .......................... G02B 1/10; G02B 5/14; G02B 5/172; C03C 25/02
[52] U.S. Cl. ...................................... 65/3.11; 65/3.43; 427/36; 427/54.1; 427/163; 264/1.5
[58] Field of Search .................. 427/54.1, 36, 163; 264/1.5; 65/3.11, 3.43

[56] References Cited

U.S. PATENT DOCUMENTS

| | | | |
|---|---|---|---|
| 3,999,834 | 12/1976 | Ohtomo et al. | 427/54.1 X |
| 4,076,510 | 2/1978 | Mracek et al. | 427/54.1 X |
| 4,099,837 | 7/1978 | Vazirani | 427/54.1 X |
| 4,125,644 | 11/1978 | Ketley et al. | 427/54.1 X |
| 4,246,299 | 1/1981 | Ohls | 427/54.1 |

Primary Examiner—James R. Hoffman
Attorney, Agent, or Firm—Peter V. D. Wilde; James H. Fox

[57] ABSTRACT

The specification describes radiation cured coatings suitable for coating fiber lightwaveguides. The coatings are relatively low modulus materials that remain rubbery throughout normal environmental temperature ranges. An exemplary coating composition comprises an oligomeric resin, which is a condensation product of a mixture of polypropylene glycols and two units of a O-hydroxy-ethylacrylate N-C aliphatic urethane, mixed with an oligomeric liquid which is a dimethylacrylate of a polyethylene glycol of molecular weight larger than 600, a monomoneric triacrylate, such as trimethylolpropane triacrylate and a photoinitiator. The coatings are free of nomoneric ingredients.

7 Claims, 2 Drawing Figures

U.S. Patent  Apr. 13, 1982  4,324,575
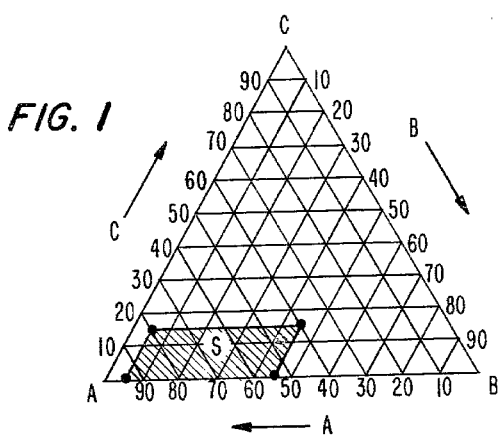
FIG. 1
FIG. 2
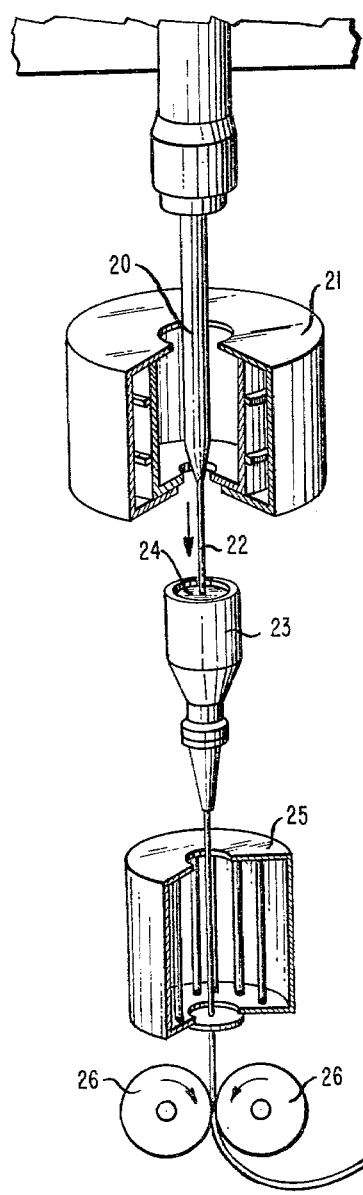

LOW TG SOFT UV-CURABLE COATINGS

CROSS-REFERENCE TO RELATED APPLICATION

This application is a continuation-in-part of my co-pending application, Ser. No. 177,096, filed Aug. 11, 1980, now abandoned.

BACKGROUND OF THE INVENTION

In recent years UV-curable coatings have received wide attention as crosslinkable coatings because of their ease of application in the liquid state. During exposure to UV radiation the coating material crosslinks and becomes relatively impermeable to solvents, acids and water. For most applications the desired properties are toughness and high modulus. This is achieved by formulating an oligomeric material of molecular weight ~1000 with a monomeric liquid in order to achieve the moderate viscosity needed for application to the part to be coated. Most typical commercial formulations contain an oligomeric material with two reactive sites and a monomeric material with one reactive site. See, for example, U.S. Pat. Nos. 4,099,837 and 4,125,644 and German Offenlegungsschrift No. 24 26 602. Both materials will undergo a chain reaction following initiation with a photoinitiator. The molecular weight between the reactive sites in the oligomeric material will thus determine the crosslink density, given that all reactive sites indeed undergo reaction. The monomeric monofunctional materials do not participate in the network formation and either homopolymerize or copolymerize without participating in the crosslinking. When homopolymerizing, they modify the properties of the cured film by acting similar to plasticizer. When copolymerizing, the monomer will extend the chains of the oligomer and incorporate its properties into the network.

Monomeric materials with three or four reactive sites are often used in addition to or instead of the monofunctional material, to increase the crosslink density.

In fiber optic applications such as single buffer coatings and/or as bonding materials for fiber packaging, low modulus materials are desired with sufficient toughness to withstand abrasion and also to minimize microbending induced transmission losses. Also environmental cycling requirements from −40 degrees C. to 90 degrees C., and the need to minimize mechanical deformations as induced by temperature dependent properties make it desirable that fiber optic materials do not have any transitions within the above temperature range. Given that their modulus should remain relatively low, a material is desired which will remain in the rubbery state throughout the above temperature range.

In commercial formulations, materials that cure to form soft crosslinked polymers are obtained by increasing the amount of monomeric diluent and/or by using elastomeric oligomers such as polyurethanes preferentially to, for example, polyesters.

The lower modulus is achieved by plasticization with a homopolymer having in general a low glass transition temperature. A disadvantage of this method is that material properties are determined by the amount of monomeric diluent, and small variations in the composition usually imply relatively large changes in mechanical properties. The latter is avoided by the approach that we have taken in order to obtain soft UV-radiation crosslinkable materials, but with sufficient toughness to withstand abrasion.

We establish five desirable criteria for the design and formulation of soft UV-radiation crosslinkable materials:

1. The materials used in the prepolymer should be primarily elastomeric oligomers rather than monomeric compounds with high entropy functional groups: examples for these oligomers are O-aliphatic, N-aliphatic urethanes and aliphatic polyethers. These oligomers have low temperature glass transitions. Crosslinked polyetheracrylates and methacrylates also show reduced water permeability and absorptivity compared to more polar oligomers such as polyesters and urethane urea oligomers.
2. Another manner of obtaining crosslinked soft rubbery materials with low temperature glass transitions is the use of materials with the potential of lowering the symmetry of the network, such as would be the result of using branched oligomers and mixtures of acrylate and methacrylate terminated oligomers. The latter have a high entropy and tend not to aggregate even at low temperatures.
3. In order to obtain a homogeneous network, the mechanical and physical properties of which will be less dependent on the exact formulation, all oligomers should be able to take part in the crosslinking reaction. This is achieved by using only materials with two or more reactive groups. The crosslink density can now be achieved by adjusting the molecular weight between reactive groups.
4. Also in order to obtain a homogeneous network, materials with similar polymerization rate constants should be used. As a result of this, copolymerization, rather than homopolymerization, is expected to occur.
5. Strong intermolecular interactions should be avoided, since they create a strong temperature dependence of the physical and mechanical properties. Molecules with aliphatic and non-polar groups rather than aromatic and/or polar groups fulfill this requirement.

Statement of Invention

We have applied these criteria in the formulation of a variety of soft, UV-radiation or high energy ionizing radiation crosslinkable prepolymers useful in high speed curing, e.g., >0.5 m/sec, 0.8 J/cm² total curing flux of light with 250 nm $>\lambda>$ 410 nm.

The primary ingredients in these prepolymers are oligomers with multiple functional groups. The physical properties of the polymerized coating are adjusted by changing the molecular structure between the functional groups. Considerable flexibility in material design results without sacrificing the needed modulus and extended glass transition range. The prepolymers may contain additionally an initiator to promote radiative curing, preferably a photoinitiator responsive to UV-radiation. In order to obtain the desired physical characteristics over an extended temperature range it is recommended that the oligomers in the prepolymer have ten or more carbon atoms and that the specific rate of polymerization, $k_o$, of the oligomers have values that match to within 15% of the smallest value.

BRIEF DESCRIPTION OF THE DRAWING

FIG. 1 is a ternary plot representing recommended ratios of ingredients for the coating materials described; and FIG. 2 is a schematic representation of a typical fiber drawing apparatus.

DETAILED DESCRIPTION

The prepolymers comprise a mixture of at least three ingredients, an oligomeric resin, an oligomeric liquid, and a photoinitiator. For simplicity in exposition, these ingredients will be referred to by symbols A, B, and D. A fourth ingredient, a monomeric polyfunctional acrylate, designated C, is an optional constituent added in some of the formulations to be described in order to increase crosslinking where desired for increased modulus.

The oligomeric resin is essentially the backbone of the coating material. According to a preferred form of the invention it is a condensation product of a mixture of poly-glycols with an aliphatic urethane in accordance with the following generalized formulation. The resin is prepared by reacting the following:

(1) polypropylene glycol of the formula:

wherein $n_1$ is in the range of 12 to 80. The recommended range is based on the view that if the molecular weight is too low one loses the advantage of multiple ether bonds and the material loses flexibility. Moreover, lower molecular weight materials are volatile and may result in defects introduced by volatilization of uncured reactant during later processing. Very high molecular weight materials, n, greater than 80, are regarded as undesirably viscous, although such materials could conceivably be used with provision for special handling and processing. Moderate to high molecular weight, with n in excess of 18, may be desired for high elasticity (elongation).

(2) an aliphatic diisocyanate of the formula:

$$O=C=N-R_1-N=C=O \qquad (2)$$

wherein $R_1$ is an aliphatic radical. Available materials suitable for this constituent are 1,6-hexamethylenediisocyanate and dicyclohexylmethane diisocyanate. These materials are readily available, the latter typically in the form of para-isomers. Ortho, meta and mixtures of any of these isomers should be equally effective. Straight or branched chains of other aliphatic radicals are also regarded as useful. The only limitation we know of is the practical one, availability.

The constituents (1) and (2), when reacted together in approximately a one-to-two ratio, produce the following:

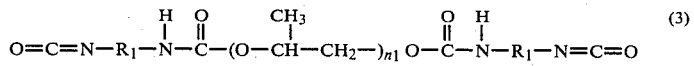

A straightforward variation of this reaction involves reversing the stoichiometric ratio thus producing an intermediate having (1)-(2)-(1) symmetry rather than the (2)-(1)-(2) symmetry just depicted. Either approach may be followed.

The intermediate compound (3) is then reacted with an excess of:

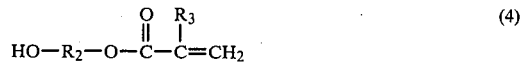

where $R_2$ is an alkyl group of 1–4 carbon atoms and may be straight or branched (iso), and $R_3$ is hydrogen or methyl. The hydroxyl group of the acrylate (4) reacts with the isocyanate groups of (3) to form:

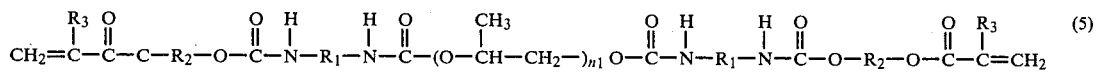

This prepolymer ingredient will be recognized as having (4)-(2)-(1)-(2)-(4) symmetry with respect to the three individual reagents (1), (2) and (4).

A similar end structure is reached by following the alternative mentioned earlier, using an intermediate having (1)-(2)-(1) symmetry rather than the intermediate shown in formula (3). In this event the intermediate is reacted with acrylic or methacrylic acid to produce the same end functionality. Thus it will be appreciated that the procedure described here for forming the desired end product is to be regarded as an exemplary (but preferred) synthesis approach. Other alternatives to reach essentially the same result may be devised by those skilled in the art.

The liquid oligomer recommended in this embodiment, ingredient B, is a polyalkyl glycol dimethacrylate, with the glycol being preferably polyethylene or polypropylene. The generic formula for this constituent is:

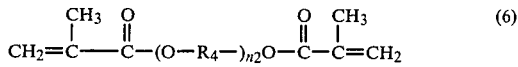

where $R_4$ is ethyl, propyl or isopropyl and $n_2$ is 4–15 when $R_4$ is ethyl and 3–80 when $R_4$ is propyl or isopropyl.

The selection of $n_2$ follows considerations similar to those used for the selection of $n_1$. The range for ethylene based groups tends to be more limited than that for propylene based groups because the former tends to crystallize as n exceeds about 15.

Ingredient designated "C", a difunctional or trifunctional acrylate monomer, is regarded as optional in the prepolymer mixture. The need for adding C depends somewhat on which alternatives are chosen for A and B. Ingredient C is essentially an aid to crosslinking and increases modulus. Those skilled in the art will recognize that relatively low modulus materials are desirable for the application described here. Ingredient C also accelerates curing of the prepolymer mixture. Higher molecular weight glycols cure faster than those with lower molecular weight. Consequently, inclusion of amounts of ingredient C would be indicated in mixtures having low molecular weight glycols. Most effective results have been obtained in practice with higher molecular weight oligomers and lower proportions of the polyfunctional acrylate monomer. In fact, the most advantageous compositions produced to date have no polyfunctional acrylate monomer.

The polyfunctional acrylate monomer can be represented by the formula:

$$R(Ac)_x \qquad (7)$$

where R is an aliphatic group of 1–10 carbon atoms and x is 2 or 3.

In the embodiments described specifically herein R is trimethylolpropane. Other useful materials that are readily available are pentaerythritol triacrylate, and 1,6-hexanedioldiacrylate.

The most appropriate prescription for this ingredient is a "polyfunctional acrylate", since the structure to which the active acrylate groups are attached appears to be relatively unimportant.

As indicated earlier, preferred prepolymer mixtures contain a photoinitiator, designated component D, to initiate curing of the polymer after application to the article being coated. While other photoinitiators may be found useful, the preferred photoinitiators for the mixtures described herein are benzophenones, and preferably chlorinated benzophenones. It has been found that certain conventional photoinitiators, e.g., benzoin type photoinitiators, are less effective than benzophenones in promoting curing of the materials described here. The photoinitiator used to obtain the data described in this specification was F1-4, available from Eastman Kodak.

The amount of photoinitiator used may vary widely and is most appropriately specified as an "effective amount," well within the skill of the art to select. Amounts would generally be within the range of 0.1 to 10%, and I have found that approximately 2.5% is preferred.

The coatings applied according to this invention are preferably photocured. However, high quality polymer coatings are frequently applied to wire products using high energy radiation curing, and no fundamental reason is known why that approach would not be useful for coating glass fiber waveguides. Higher energy radiation curing parameters are discussed in U.S. Pat. No. 4,125,644. Typically in such processes an initiator is not necessary.

Results with various specific examples are given in the following table, along with some representative physical properties. The ingredient under the generic category A is a reaction product of polypropylene glycol with n equal to approximately 24, isophorone diisocyanate, and hydroxyethylacrylate.

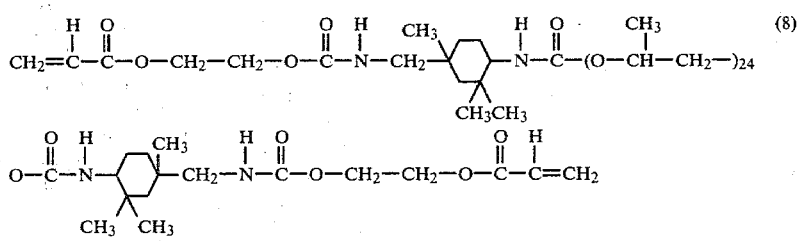

Whereas the data was collected using isophorone diisocyanate, a recommended alternative is dicyclohexylmethane diisocyanate which produces this very similar reaction product:

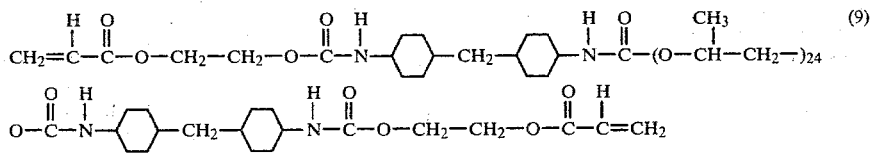

Ingredient of category B is polyethylene glycol dimethacrylate, the ingredient of category C is trimethylolpropane triacrylate and D, the photoinitiator, is F1-4.

TABLE I

|   |   | 1 | 2 | 3 | 4 | 5 | 6 | 7 | 8 | 9 | 10 | 11 | 12 |
|---|---|---|---|---|---|---|---|---|---|---|----|----|----|
| A. | OLIGOMERIC RESIN | 49.0 | 67.8 | 48.5 | 77.6 | 77.6 | 72.8 | 54.0 | 75.5 | 76.9 | 67.3 | 67.3 | 57.7 |
| B. | OLIGOMERIC LIQUID | 39.2 | 19.5 | 34.0 | 9.7 | 14.6 | 19.4 | 43.1 | 21.6 | 9.6 | 19.2 | 28.9 | 28.9 |
| C. | PHOTOINITIATOR | 2.0 | 2.9 | 2.9 | 2.9 | 2.9 | 3.0 | 2.9 | 2.9 | 3.85 | 3.85 | 3.84 | 3.85 |
| D. | MONOMERIC POLYFUCTIONAL ACRYLATE | 9.8 | 9.8 | 14.6 | 9.8 | 4.9 | 4.8 | — | — | 9.6 | 9.6 | — | 9.6 |
|   | Elongation % | 19.0 | 30.0 | 18.0 | 28.0 | 14.0 | 20.0 | 17.0 | 18.0 | 28.3 | 19.38 | 18.9 | 24.75 |
|   | Tangent Modulus MPa | 9.0 | 8.1 | 19.3 | 10.9 | 10.3 | 9.5 | 6.8 | 6.4 | 12.84 | 10.63 | 1.8 | 7.7 |

*Weight %*

The recommended ratio of ingredients A, B, and C is A:40-90% by weight, B:5-45% by weight, and C:zero-15% by weight. These compositions are represented in the ternary plot of FIG. 1 by the shaded area "S". Compositions within this range will depend on the particular choice of the materials for the A, B, C categories, although, as indicated by the table, the entire range has been sampled for the particular materials of the example and thereby is regarded as a representative range regardless of the combination of specific materials chosen.

Fiber lightwaveguide coatings according to a preferred embodiment of this invention contain exclusively oligomers in the prepolymer mixture. I have conducted tests that establish that inclusion of monomers in the prepolymer mixture leads to aging problems of the coating. Monomers are added conventionally to prepolymer mixtures for a variety of reasons, but generally to reduce the viscosity of the mixture in order to facilitate processing. In that connection, monomer additions are ubiquitous in the art. The aging problems that I have identified have been established by me empirically, but I believe they are predictable due to homopolymerization of the monomer, which results in reduction of the crosslink density and an adverse effect on the physical properties of the coating. I found also that monomer additives tend to volatilize on aging thus changing the modulus and other physical properties during the service life of the product. Thus I have established the technological importance of forming fiber lightwaveguide coatings from prepolymer mixtures containing only oligomers. Mixtures of oligomers have more uniform relative reactivities, and form more consistently crosslinked polymer networks. This result is particularly needed in fiber lightwaveguide coatings due to the acute sensitivity of optical losses in the waveguide to physical properties of the coating, and changes in those properties. I have found that to reach these objectives the specific rate of polymerization, $k_o$, of the respective oligomer constituents in the prepolymer mixture have values that match to within 15% of the smallest value.

The coating materials just described may find wide application wherever, for example, resilient materials are needed. However, we regard these materials as exceptionally well adapted for coating lightwaveguide fibers. The materials have been rigorously engineered for suitability for that application. Important combinations of physical properties have been met in the light of stringent light transmission requirements. Abrasion resistance, fiber break strength, microbending losses, aging, manufacturability of the individual fiber, cabling of the fibers and other considerations all impose restraints on the chemistry of the fiber coating material. Compositions in the system described here have been found to meet these demanding standards. Accordingly, these coating materials are highly recommended for use in lightwave fibers and cable.

The following is a description of a suitable apparatus for applying the coating to a fiber. The fibers being coated are conventional and well known in the art and form no part of the invention. However, the fiber coated with the compositions described is considered to be an advance in the art.

FIG. 2 shows a fiber coating arrangement consisting of fiber preform 20, a fiber drawing furnace 21, drawn fiber 22, coating apparatus 23 filled with coating material 24, means 25 for curing the coating, which in this case is a series of ultra violet lamps, capstan 26, and take-up reel 27. To coat the fiber, prepolymers of the compositions described are placed in coating applicator 23, and the fiber drawn in the conventional way. Coating materials described earlier have the capacity of curing at a rate sufficient to allow the fiber to be drawn at speeds of the order of 1 m/sec, with 0.8 J/cm² curing light flux and wavelength in the range of 250 to 410 nm. The curing rate of the coating composition is particularly important if the coating is the primary coating, or if it forms part of the primary coating. In these cases the coating operation must be "in-line" with the fiber producing operation and hence must operate at the rate the fiber is drawn. The reason is that to preserve the strength of the fiber it must receive at least a primary coating prior to any form of physical handling. Fiber drawing speeds in excess of 20 m/min. are typical. In a typical apparatus the curing section is of the order of 0.25–0.5 meter in length, thus the nominal curing time of the coating material is of the order of one second. Commercial considerations favor faster drawing speeds so that coating materials with faster cure times are desirable.

Wherein in-line coating of glass fiber waveguides is the approach generally followed, the second part of a dual layer coating or multiple layer coating can be performed as an independent operation. Obviously, the coating materials described herein may be used alone or in combination, either primary or otherwise, with other materials in multilayer coatings. As observed earlier the coating material described herein was carefully engineered for use in conjunction with fiber lightwaveguides, typically as the primary coating but optionally as one coating of a multiple coating system. Those skilled in the art will have no difficulty in distinguishing a coated fiber lightwaveguide as an article of manufacture. Among the distinctive characteristics is the well known core-cladding configuration in which the cladding has a refractive index different from that of the core.

In the event that the coating materials of the invention are exposed to high temperature service environments it is recommended that approximately 0.5 to 2% of an antioxidant be added to the formulation to prevent degradation of the polymer. Satisfactory aging behavior has been observed under relatively severe conditions with compositions containing 1.2% by weight of Irganoz 1076 (Ciba-Geigy). Other ingredients such as fillers, stabilizers, coloring agents, etc., can be added as desired to the coating materials of the invention.

Various additional modifications and extensions of this invention will become apparent to those skilled in the art. All such variations and deviations which basically rely on the teachings through which this invention has advanced the art are properly considered to be within the spirit and scope of the invention.

What is claimed is:

1. A method for producing a fiber lightwaveguide comprising the steps of:
    drawing the fiber lightwaveguide
    passing the drawn fiber lightwaveguide through a prepolymer mixture to wet the fiber lightwaveguide with the prepolymer mixture,
    passing the wetted fiber through a die to form a coating of prepolymer mixture on the fiber lightwaveguide,
    curing the prepolymer coating by exposing the prepolymer coated fiber lightwaveguide to radiant energy
    the invention characterized in that the prepolymer mixture contains a mixture of at least two oligomers having more than 10 carbon atoms and the specific rates of polymerization of the oligomers have values that match to within 15% of the smallest value.

2. The method of claim 1 in which the radiant energy is ultraviolet light.

3. A method for coating a fiber lightwaveguide comprising the steps of:

applying to the fiber a mixture of

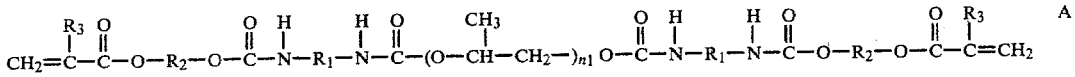

where $R_1$ is an aliphatic radical, $R_2$ is an alkyl group of 1–4 atoms, $R_3$ is hydrogen or methyl, and $n_1$ is in the range of 12 to 80

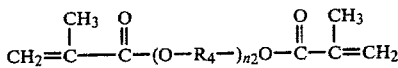

where $R_4$ is ethyl, propyl or isopropyl and $n_2$ is 4–15 when $R_4$ is ethyl and 3–80 when $R_4$ is propyl or isopropyl, and curing the mixture by exposing it to high energy or ultraviolet radiation.

4. The method of claim 3 in which the relative amounts of the ingredients is described by the shaded area "S" in FIG. 1 and the optional ingredient "C" is a polyfunctional acrylate monomer.

5. The method of claim 4 in which the mixture additionally includes a photoinitiator.

6. The method of claim 5 in which the photoinitiator is a chlorinated benzophenone.

7. The method of claim 3 in which: ingredient A is

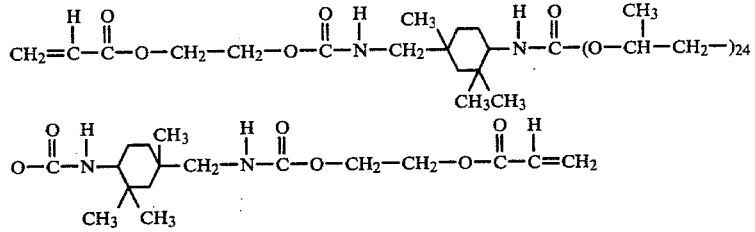

* * * * *